United States Patent [19]

Baier et al.

[11] Patent Number: 5,147,254

[45] Date of Patent: Sep. 15, 1992

[54] TORQUE TRANSMISSION UNIT FOR THE DRIVE CONNECTION OF A SECONDARY UNIT WITH AN INTERNAL COMBUSTION ENGINE

[75] Inventors: Wolfgang Baier, Gochsheim; Walter Kurz, Durach, both of Fed. Rep. of Germany

[73] Assignee: Fichtel & Sachs AG, Fed. Rep. of Germany

[21] Appl. No.: 526,297

[22] Filed: May 21, 1990

[30] Foreign Application Priority Data

May 24, 1989 [DE] Fed. Rep. of Germany ....... 3916979

[51] Int. Cl.⁵ .................... F16H 47/00; F16H 37/00; B60K 7/00; F16D 23/00
[52] U.S. Cl. .................................... 475/121; 475/118; 475/119; 192/0.076; 74/15.63; 180/53.7; 180/53.8
[58] Field of Search ............. 475/116, 118, 119, 121; 74/15.4, 15.63, 15.66; 192/0.07, 0.072, 0.075, 0.076; 180/53.7, 53.8

[56] References Cited

U.S. PATENT DOCUMENTS

| | | | |
|---|---|---|---|
| 2,911,961 | 11/1959 | McRae | 180/53.7 X |
| 4,540,078 | 9/1985 | Wetrich | 192/87.11 |
| 4,679,674 | 7/1987 | Sakakiyama | 192/0.07 X |
| 4,732,246 | 3/1988 | Tateno et al. | 192/0.073 X |
| 4,760,902 | 8/1988 | Bellanger | 192/0.076 X |
| 4,955,257 | 9/1990 | Terayama et al. | 74/866 |

FOREIGN PATENT DOCUMENTS

| | | | |
|---|---|---|---|
| 3104964 | 2/1982 | Fed. Rep. of Germany . | |
| 2627132 | 8/1989 | France | 180/53.8 |
| 1153157 | 4/1985 | U.S.S.R. | 74/15.63 |
| 1284854 | 1/1987 | U.S.S.R. | 74/15.4 |

Primary Examiner—Richard Lorence
Assistant Examiner—Benjamin Levi
Attorney, Agent, or Firm—Brumbaugh, Graves, Donohue & Raymond

[57] ABSTRACT

A torque transmission unit is connectable to an internal combustion engine in order to drive a secondary unit with different transmission ratios in dependence upon the rotation rate of the internal combustion engine so that in the case of a low rotation rate of the internal combustion engine the transmission ratio is greater and in the case of a great rotation rate of the internal combustion engine the transmission ratio is less. The torque transmission unit comprises a planetary gear, a freewheel and a clutch. By the clutch a part of the planetary gear can be coupled to or separated from another part of the planetary gear or a stationary support part, according to choice. The clutch is hydraulically actuable. The pressure for the hydraulic actuation of the clutch is delivered by a hydraulic pump which is integrated into the torgue transmission unit and is independent from the lubricant circuit of the internal combustion engine.

6 Claims, 8 Drawing Sheets

TORQUE TRANSMISSION UNIT FOR THE DRIVE CONNECTION OF A SECONDARY UNIT WITH AN INTERNAL COMBUSTION ENGINE

BACKGROUND OF THE INVENTION

The invention relates to a torque transmission unit for the drive connection of at least one secondary unit with an internal combustion engine, comprising an input member for connection with an output shaft of the internal combustion engine, an output member for connection with the secondary unit, a planetary gear, a free-wheel and a clutch device for rotation-fast connection of a member of the planetary gear with a stationary support part or with another member of the planetary gear.

When there is mention of planetary gears, this term is to be understood in the broadest sense. The breadth of the term planetary gear appears from an article by Herbert W. Müller in the periodical ANTRIEBSTECHNIK 28 (1989), No. 4, page 57, where there is reference especially to the sketches of principles (a) to (g) therein. By planetary gear within the meaning of the invention there are understood all those gears in which it is possible by installation of a free-wheel between two gear parts and a clutch between two gear parts to achieve a variation of transmission ration between input part and output part simply in that the clutch is opened or closed according to choice. It is then not necessary that a hollow wheel be present in addition to a sun wheel, a crosspiece and a planet wheel. Rather the hollow wheel can be replaced by a further sun wheel. The planet wheel can be of single-stage or two-stage construction. If two sun wheels are used, the planet wheel can be made also as a bevel wheel which meshes at the same time with the two sun wheels—likewise formed as bevel wheels.

The free-wheel does not necessarily need to be arranged between two rotating parts of the planetary gear, but can be arranged between a stationary support part and a rotating part of the planetary gear. Likewise the clutch device does not necessarily need to be arranged between a rotating part of the planetary gear and a stationary part; rather can it be arranged equally between two rotating parts of the planetary gear.

Examples of embodiments of planetary gears are also disclosed for example in Published German Application P 37 40 082.7 of the Applicants (publication date: Jun. 8, 1989), and in corresponding patent applications in
Great Britian 8,827,300.8; (abandoned)
France 8,616,094
U.S. application Ser. No. 272,739; (abandoned)
Italy 68,049-A/88.

STATEMENT OF THE PRIOR ART

Such a torque transmission unit is known from DE-OS 3,622,335. The presence of the free-wheel and the clutch permits of varying the transmission ratio between the input member and the output member, solely by actuation of the clutch device. Thus it becomes possible in the case of a low rotation rate of the internal combustion engine to set a large transmission ratio so that despite a-low rotation rate of the input member the output member rotates at a relatively high rate; on the other hand in the case of a high rotation rate of the input member it is possible by actuataion of the clutch to set a low transmission ratio and thus to achieve the object that despite the high rotation rate of the input member the output member rotates at a relatively low rate. This signifies that in the case of running through the entire rotation rate range of the internal combustion engine, the rotation rate of the secondary unit is varied less than the rotation rate of the internal combustion engine. This is desired to a great extent for the secondary units develop their maximum effectiveness at a predetermined rotation rate and therefore the object is that the actual rotation rate of the secondary units should differ as little as possible from this predetermined rotation rate. This is valid, for example, in the case of a light generator or an air-conditioning compressor as secondary unit. By the switching over of the transmission ratio the object is achieved that the lighting generator or air-conditioning compressor runs at a relatively high rotation rate even at a low rotation rate of the internal combustion engine and does not run too fast in the case of high rotation rates of the internal combustion engine.

It is known from DE-OS 36 22 335 to use a friction clutch as clutch device and to engage and disengage this friction clutch by a clutch actuation appliance which is charged by the lubricant system of the internal combustion engine.

Now it has appeared that the actuation of the clutch device by the lubricant system of the internal combustion engine is still worthy of improvement. More particularly, it has appeared that the hydraulic operating elements to be used for the control of the clutch are sensitive to impurities which can occur in the oil of the lubricant circuit and can lead to faults in the torque transmission unit and thus to interruptions of operation of the torque transmission unit itself. Such operational faults can lead to serious defects in the operational capacity of the power unit installed, for example, in a motor vehicle in that the electric generator driven by the torque transmission unit and thus the entire current supply installation can fail.

OBJECT OF THE INVENTION

It is the object of the present invention to develop a torque transmission unit of the type initially designated so that it is independent of the lubricant oil circuit of the internal combustion engine.

SUMMARY OF THE INVENTION

In view of the above object, a torque transmission unit is provided for connecting at least one secondary unit to an internal combustion engine. this torque transmission unit comprises an input member for connection to an output shaft of the internal combustion engine, an output member for connection to the secondary unit, a planetary gear, a free-wheel and a clutch device for rotation-fast connection of a member of the planetary gear with a stationary support part or with another member of the planetary gear. The clutch device is actuable by the output pressure of a hydraulic pump which is integrated in the torque transmission unit. As far as the term "planetary gear" is concerned, reference is had to the above statements relating to the Background of the Invention.

In the case of the development according to the invention, the hydraulic circuit of the clutch device and its control system are completely independent of the lubricant oil circuit. This has the additional advantage that the installation of the torque transmission unit is facilitated inasmuch as only the mechanical coupling between the torque transmission unit and the internal combustion engine has to be produced, but no conduit connection between the lubricant oil circuit of the internal combustion engine and the clutch device.

The clutch device can preferredly be formed as a friction clutch device to which a clutch actuation appliance is allocated; this clutch actuation appliance is then supplied by the hydraulic pump integrated into the torque transmission unit. The integration of the hydraulic pump into the torque transmission unit leads to short conduit paths of the hydraulic circuit. All the conduits can be accommodated within the torque transmission unit and are therefore protected against damage in action upon the internal combustion engine and its surroundings.

Surprisingly it has appeared that the space necessary for the integration of the hydraulic pump, within the torque transmission unit, is so slight that the torque transmission unit can be constructed without substantial enlargement compared with known forms of embodiment, such as that according to DE-OS 3,622,335. This is of essential importance because the space available for the installation of the torque transmission unit in motor vehicles is extremely limited. With regard to this space limitation it also proves especially advantageous that no external connecting conduits are required for the hydraulic feed of the clutch, because thus the installation of the torque transmission unit in the engine compartment of the motor vehicle concerned is specifically facilitated under constricted spatial conditions.

It has appeared that as regards power consumption it is entirely tolerable if the hydraulic pump is constantly driven by the torque transmission unit, as long as the torque transmission unit is driven by the internal combustion engine.

In this case the regulating valve can also be formed so that in operational phases in which no clutch actuation takes place or is expected, a change-over is made to free through-flow, so that the power consumption of the hydraulic pump, which is in any case already slight, then becomes still less, seen in time average. The predetermined pressure which is maintained at the output of the hydraulic pump for the service of the clutch device can be variable, perhaps due to the fact that the through-flow cross-section of the regulating valve is varied. Thus the torque to be transmitted by the clutch device can be varied. A variation of this torque can be desired, for the following consideration:

The transmittable torque must naturally be so great that in stationary operation it can transmit the drive moment required by the respective secondary units. On change-over of the transmission ratio in the direction of a faster drive of the secondary unit in each case it is however under some circumstances desired to maintain a slip in the clutch, so that reaction upon the internal combustion engine and thus upon the travelling comfort of the motor vehicle due to an impact-type acceleration of the secondary unit concerned does not take place. This can be achieved by permitting slip in the clutch device. However on the other hand the slip in the clutch must be kept so slight that a thermal overloading of the clutch device does not occur. It can be desirable to control or regulate the pressure prevailing at the output of the hydraulic pump, by once-only setting or by continuous regulation of the regulating valve, so that the jerk on the internal combustion engine occurring on engagement of the transmission is for the one part kept as slight as possible, but on the other hand a thermal overloading of the clutch device is kept absent. The controlling or regulation of the regulating valve can here occur due to operational parameters of the internal combustion engine. Alternatively on the delivery side of the hydraulic pump there can be attached a delay member for example in the form of a pressure reservoir which is filled up only gradually on shifting of the change valve.

It is advisable that the hydraulic pump should draw from a tank which is integrated into the torque transmission unit. This again is especially advantageous because then external conduits, which would have to be closed in the installation of the torque transmission unit, are completely eliminated. Then at least a part of the tank can be arranged stationarily in relation to the internal combustion engine concerned, for example on the stationary support part.

Moreover it is possible for at least a part of the tank to be formed in a rotating part of the torque transmission unit, so that a rotating fluid ring forms within the torque transmission unit. This solution offers the additional advantage that the hydraulic pump can be supplied with a certain initial pressure from the fluid ring, in that an intake pipe is introduced tangentially into the fluid ring, namely contrarily of the direction of rotation of the fluid ring.

An especially simple and space-saving form of embodiment of the planetary gear consists in that the planetary gear comprises a sun wheel, a cross-piece with at least one planet wheel and a hollow wheel, the planet wheel meshing simultaneously with the sun wheel and the hollow wheel.

On the basis of such a planetary gear type the overall assembly of the torque transmission unit can further be simplified in that the cross-piece is connected for common rotation with the input member, in that the hollow wheel is connected for common rotation with the output member, in that the sun wheel is securable by the clutch device in relation to the support part and in that the free-wheel is provided between the cross-piece and the hollow wheel, in such a manner that either the cross-piece entrains the hollow wheel by means of the free-wheel or the hollow wheel can overtake the cross-piece.

As hydraulic pumps there are especially considered positive displacement pumps and preferably roller-cell pumps, but also gear pumps or piston pumps.

A plate-type clutch device comes especially into consideration as clutch device.

The hydraulic pump can be used, in addition to its function of clutch actuation, also for the supply of lubricating oil to lubrication-requiring parts of the torque transmission unit, and especially for bearing lubrication. Furthermore the hydraulic pump can also be used for the cooling of cooling-requiring parts of the torque transmission unit, especially for cooling the friction clutch. In order in this action to avoid overheating of the hydraulic fluid, it is possible for at least one part which conducts hydraulic oil, in the hydraulic circuit, to be provided with cooling fins.

In order, in the changing of the transmission ratio, to avoid fluttering of the clutch device, it is proposed that this device is closed and released at different rotation rates, that is with a hysteresis. This hysteresis must take account of the transmission jump when the controlling of the clutch takes place in dependence upon the rotation rate of the output member: If in fact with a rising rotation rate of the internal combustion engine a change takes place to reduced transmission ratio, that is reduced rotation rate of the output member, and if the change takes place in dependence upon the rotation rate of the output member, then the rotation rate of the output member in changing reduces and then, in the absence of a corresponding hysteresis, a change back to the greater transmission ratio would have to take place immediately again.

It is advisable to provide a safety device which, at a pre-determined rotation rate of a rotating part of the planetary gear influences the clutch device in the direction of a reduction of the transmission ratio between input member and output member, so that the output member is changed over to a reduced rotation rate.

This safety device ensures that even if the expected change-over of the transmission ratio with rising rotation rate of the internal combustion engine does not occur, at a rotation rate of the internal combustion engine lying above the normal change point in any case the reduction of the transmission ratio between input member and output member takes place, so that the output member is changed over to a reduced rotation rate and the secondary drive unit driven by the output member cannot be damaged by an over-high rotation rate.

The clutch device can be controlled by a logic control system which triggers a change-over of the clutch device between closed and disengaged conditions in dependence upon a plurality of operational parameters. Thus for example it is possible that the transmission ratio between output member is variable in the direction of an increase of the rotation rate of the output member, if:

(a) a notification of the shortfall of a pre-determined first rotation rate of a rotating part of the planetary gerar is present and (b) a notification regarding a need for an increase of rotation rate is present from the secondary unit or a system supplied by the secondary unit. The additional condition (b) for a variation of the transmission ratio in the direction of an increase of the rotation rate of the output member is conducive to driving comfort: Then in fact the change of transmission ratio does not occur every time a pre-determined first rotation rate is understepped, but only when at the same time a notification is present as to the need for increase of rotation rate. The jolts on the internal combustion engine, to be expected due to engagement of a higher transmission ratio, are thus reduced in number. The driving comfort can be still further refined in that the transmission ratio between output member and input member is variable in the direction of an enlargement of the rotation rate of the output member, if in addition to the notifications (a) and (b) (c) at least one of the notifications according to (a) and (b) persists over a first pre-determined time.

Thus a variation of transmission ratio is avoided if for only a short time the pre-determined first rotation rate is understepped and/or for only a short time a notification is present from the secondary unit, relating to a need for an increase of rotation rate.

Driving comfort can be increased still further in that the transmission ratio between output member and input member is variable in the direction of an increase of the rotation rate of the output member, if in addition to notifications according to (a) and (b) and possibly also (c)

(d) a notification as to a pre-determined retardation of the rotation rate of a rotating part of the planetary gearing is present.

The reason for this measure is as follows: If a rotation rate is altered on the basis of a notification (a) or (b) in the direction of an increase of the rotation rate of the output member, this signifies, as already explained earlier, an impact-type reaction upon the internal combustion engine, since this, according to the slip behaviour of the clutch device, is loaded more or less heavily by the additional acceleration of the secondary drive unit. If now the transmission ratio increase is placed at a moment when in any case a retardation of the internal combustion engine is occurring, perhaps because the motor driver is braking before a traffic light, then the reaction of the additional acceleration of the secondary drive unit due to the increase of the transmission ratio is hardly noticeable for the driver, for firstly then the secondary unit must in any case be accelerated only to that rotation rate which corresponds to the rotation rate of the internal combustion engine which establishes itself after the termination of the clutch actuation time, and also the driver can hardly distinguish between that retardation of the internal combustion engine which he intends in any case to bring about by braking of the vehicle or reducing pressure on the accelerator pedal, and that rotation rate reduction of the internal combustion engine which occurs due to acceleration of a secondary unit caused by change of transmission ratio.

The dependence of the triggering of an upward transmission ratio change upon a pre-determined retardation of the rotation rate of a rotating part of the planetary gear, finally thus a pre-determined retardation of the internal combustion engine, could lead to the upward change of transmission ratio being too long delayed, if the driver, for example in driving straight ahead on a level road over a lengthy period, does not cause a retardation of the internal combustion engine speed. In order to prevent the upward change of rotation rate being delayed in such a case too long, as alternative to notification (d) the upward change of transmission ratio can be triggered by a notification (e) as to the falling short of a further pre-determined rotation rate which is lower than the first pre-determined rotation rate. Furthermore the excessively long absence of the change of transmission ratio can also be triggered by a time measurement which shows that the one of the notifications (a) and (b) has persisted for a second pre-determined time. This second pre-determined time is as a rule greater than the first pre-determined time defined under (c), because the first pre-determined time is only intended to prevent fluttering of the transmission ratio change, while the second pre-determined time must be so long that it forms a real chance for the system to delay the upward change of transmission ratio until the occurrence of a natural retardation of the internal combustion engine.

If a dependence of the transmission ratio upward change upon a pre-determined value of a rotation rate retardation of the internal combustion engine is provided, then it is advisable to provide an accelerator for the operation of transmission ratio variation, which is effective when a notification (d) occurs, that is a notification as to the occurrence of retardation of the internal combustion engine rotation rate. The reason for the use of such an accelerator is that the retardation of the internal combustion engine rotation rate frequently persists only briefly and one must use this short time to carry out the upward rotation rate change during this retardation.

In order to take consideration of the behaviour of some drivers who occasionally let the accelerator pedal of the engine oscillate about a specific point, it is provided that the change-over of the transmission ratio between output member and input member in the direction of a higher rotation rate of the output member is inhibited when in a preceding pre-determined monitoring period a pre-determined number of change operations of the transmission ratio has been exceeded. This measure excludes fluttering of the transmission ratio if the driver by chance lets the accelerator pedal oscillate in that rotation rate range of the internal combustion engine in which a change of transmission ratio becomes likely.

BRIEF DESCRIPTION OF THE DRAWINGS

The accompanying Figures explain the invention by reference to examples of embodiment, wherein.

DETAILED DESCRIPTION OF THE PREFERRED EMBODIMENTS

Figure 1:
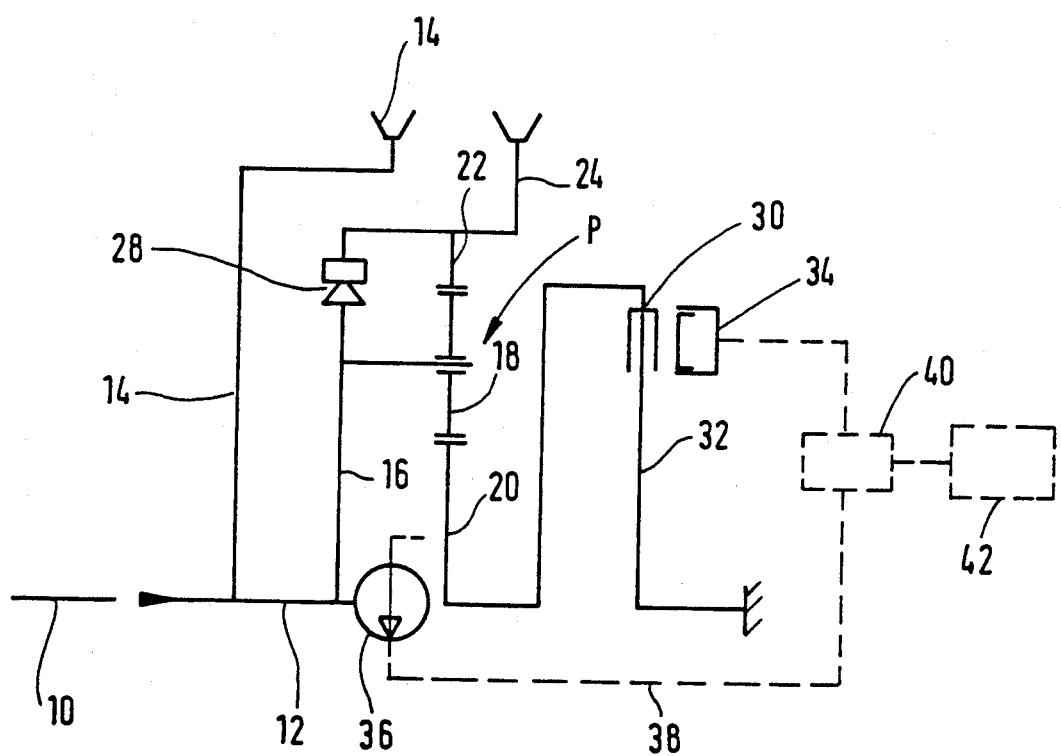
FIG. 1 shows a diagram of a torque transmission unit according to the invention.

In FIG. 1, 10 designates the output shaft of an internal combustion engine. This output shaft is adjoined by an input shaft 12 of the torque transmission unit. With the input shaft 12 there is connected a first belt pulley 14 which rotates constantly with the rotation rate of the output shaft 10, that is approximately with the crankshaft rotation rate, and serves for example for the drive of a fan. Furthermore the cross-piece 16 of a planetary gear, designated as a whole by P, is connected with the input shaft 12. On this cross-piece 16 there is mounted at least one planet wheel 18. This planet wheel 18 is at the same time in engagement with a sun wheel 20 and a hollow wheel 22 of the planetary gear P. A further belt pulley 24 serving for example for the drive of a generator is connected fast in rotation with the hollow wheel 22.

Between the cross-piece 16 and the hollow wheel 22 a free-wheel 28 is arranged which is capable of transmitting a torque from the cross-piece 16 to the hollow wheel 22 in one direction of rotation and which becomes ineffective when the hollow wheel 22 is rotating faster in this direction of rotation than is the cross-piece 16.

The sun wheel 20 of the planetary gear can be made fast through a clutch 30 on a torque support 32. The clutch 30 is closable by a hydraulic clutch actuation appliance 34. The hydraulic clutch actuation appliance 34 is supplied with pressure fluid by a pump 36. The pump 36 is constantly driven from the input shaft 12 and supplies pressure fluid through a conduit 38 and a valve group 40 to the clutch actuation appliance 34. The valve group 40 is connected with an overall control unit 42.

The manner of operation of the torque transmission unit as described so far is fundamentally as follows:

When the output shaft 10 of the engine is rotating at low rotation rate, perhaps with the idling rotation rate of the engine, the clutch 30 is closed and thus the sun wheel 20 is hindered from rotating. The planetary gear P is then included in the torque transmission from the input shaft 12 to the belt pulley 24. The cross-piece 16 is rotating with the rotation rate of the input shaft 12 and the belt pulley 24 is rotating with a stepped-up rotation rate; let the transmission ratio be named i. In that case the free-wheel 28 is ineffective, because the hollow wheel 24 is rotating faster than the cross-piece 16.

In this way even at relatively low rotation rate of the engine output shaft 10, a relatively high rotation rate of the belt pulley 24 is achieved which is sufficient to drive for example a lighting generator with the requisite rotation rate even if the engine output shaft 10 is rotating at a low rate unsuitable for driving the generator.

If the rotation rate of the engine output shaft 10 becomes greater, then at a pre-determined rotation rate the clutch 30 is opened by the clutch actuation appliance 34. Then the drive of the belt pulley 24 takes place through the free-wheel 28 with the rotation rate of the cross-piece 16 and thus with the rotation rate of the engine output shaft. The hollow wheel 22, the cross-piece 16 and the sun wheel 20 then rotate in common as a block. The planet wheels 18 are stationary in relation to the sun wheel 20 and the hollow wheel 22.

It is to be noted that the pump 36 is integrated into the torque transmission unit 36, in that for example the rotor of the pump is connected for common rotation with the input shaft 12, and the stator of the pump 36 is mounted fast in rotation.

When the clutch 30 has been released thus no more transmission takes place. The belt pulley 24 rotates at the same rate as the input shaft 12. In this way it is made sure that at high rotation rates of the input shaft 12 the belt pulley 24 does not rotate too fast and the secondary unit, for example the lighting generator, is not driven at too high a rotation rate.

Figure 2:
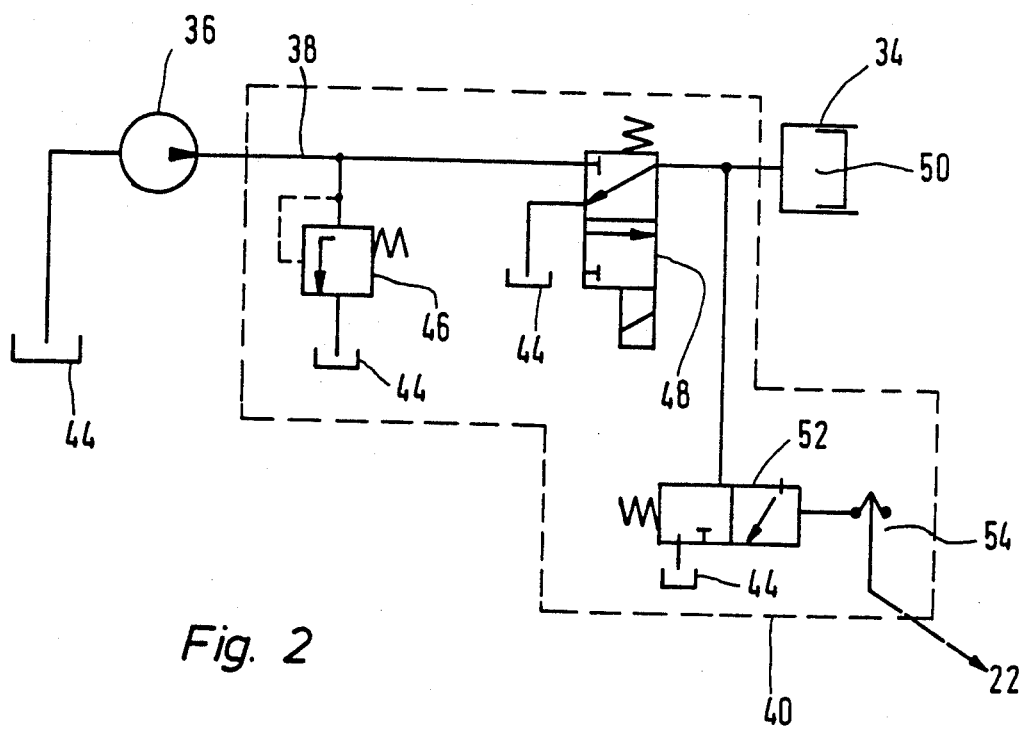
FIG. 2 shows the pump and valve group of the torque transmission unit according to FIG. 1.

In FIG. 2 like parts are provided with the same references as in FIG. 1. The pump 36 draws hydraulic fluid from a tank 44 and delivers constantly back into the tank 44. The pressure at the output of the pump 36 is determined by a regulating valve 46. In FIG. 2 the condition is represented which occurs at high rotation rate of the input shaft 12. A control valve 48 at the output of the pump 36 is situated in a position in which the clutch actuation appliance 34 is separated from the output of the pump 36 and the pressure chamber 50 of the clutch actuation appliance 34 is connected through the control valve 48 with the tank 44. This means that the clutch 30 is released and the belt pulley 24 rotates with the rotation rate of the input shaft 12.

If the rotation rate of the input shaft 12 drops, the control valve 48 is changed over so that the output of the pump 36 comes into connection with the clutch actuation appliance 34 and thus in the pressure chamber 50 of the clutch actuation appliance 34 the pressure prevailing at the output of the pump 36 is built up, which is determined by the regulating valve 46. Then the clutch 30 is closed. The planetary gear P is then effective in rotation rate transmission; the belt pulley 24 is rotating with stepped-up rotation rate.

With the pressure chamber 50 of the clutch actuation appliance 34 there is further connected a centrifugally controlled safety valve 52. This safety valve 52 is controlled by a centrifugal governor 54 which is driven preferredly by the hollow wheel 22. When the hollow wheel 22 exceeds a pre-determined rotation rate, the centrifugally actuated safety valve 57 opens to the tank, so that the pressure in the pressure chamber 50 collapses, the clutch 30 is released and the rotation rate of the belt pulley 24 is again stepped back to the rotation rate of the input shaft 12. Thus the secondary unit driven by the belt pulley 24 is prevented from assuming an over-elevated rotation rate which could lead to damage to this secondary unit.

The control valve 48 can be controlled in various ways. One first possibility of controlling is represented in FIG. 3.

Figure 3A:
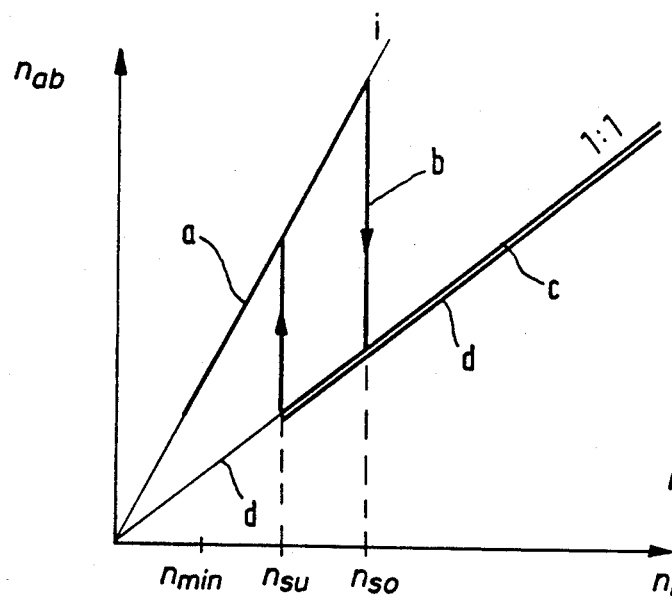
FIG. 3a shows a diagram for the illustration of the dependence of the output rotation rate of the secondary unit drive upon the output rotation rate of the internal combustion engine.
Figure 3:
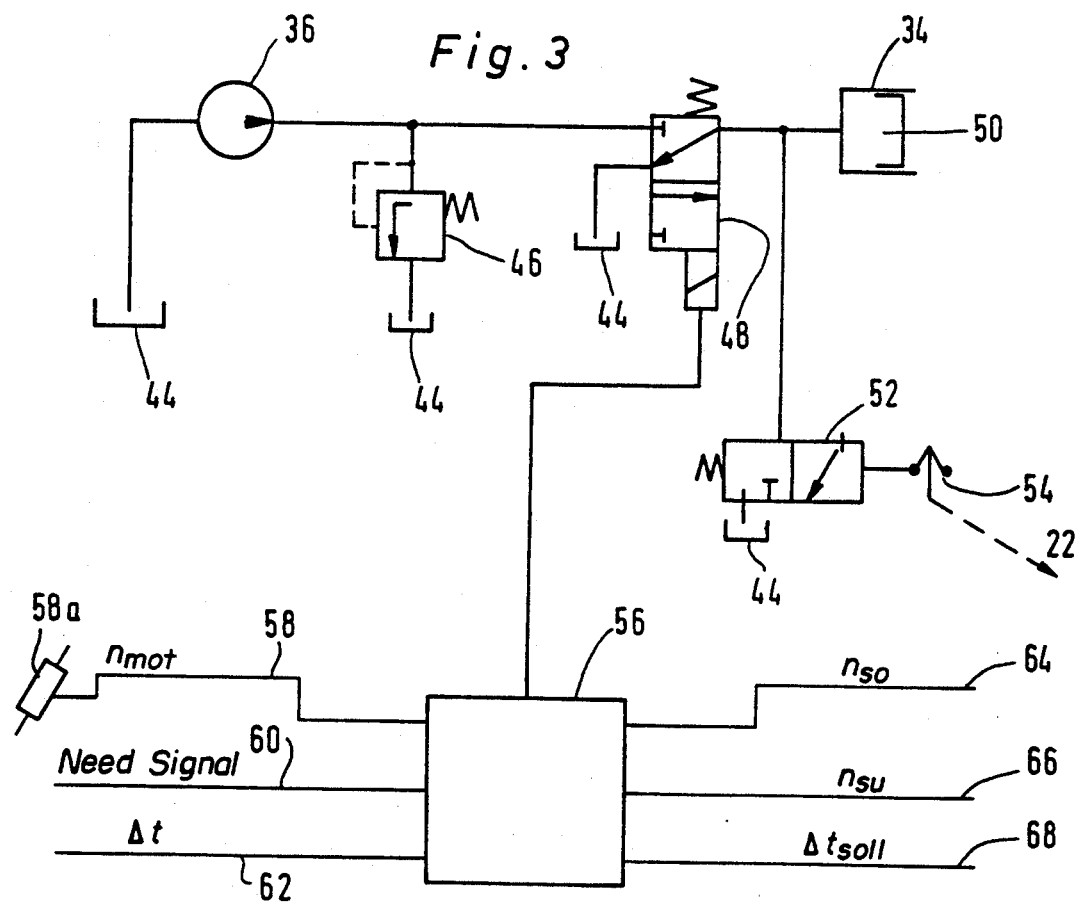
FIG. 3 shows the diagram of a first control system for the pump and valve unit according to FIG. 2.

In FIG. 3 like parts are provided with the same references as in FIG. 2. The control valve 48 is controlled by a control unit 56, (which may be part of overall control unit 42 in FIG. 1) which receives, through a signal lead 58, a signal representing the actual rotation rate $n_{mot}$ of the internal combustion engine, and through a lead 60 a need signal which appears when there is a need for increased rotation rate in a secondary unit, and is connected through a lead 62 with a timer. Moreover the control unit 56 comprises an ideal value input 64 by which a pre-determined rotation rate $n_{so}$ can be given in advance, that is to say the upper change rotation rate at which a change is to be made from the stepped-up drive of the belt pulley 24 to the direct drive. The lower change rotation rate $n_{su}$ is inserted into an ideal value input 66, that is that rotation rate at which the belt pulley 24 is to be changed over from direct drive to the stepped-up drive. Furthermore on the control unit 56 there is seen an input 68 for the statement of a delay time, the significance of which will be discussed later.

With reference to FIG. 3a, firstly the significance of the change rotation rates $n_{so}$ and $n_{su}$ should be explained. In FIG. 3a the actual rotation rate $n_{mot}$ of the internal combustion engine is entered on the abscissae axis and the actual rotation rate $n_{ab}$ of the belt pulley 24, that is the "drive output rotation rate", on the ordinate axis.

At low rotation rates of the internal combustion engine the drive of the belt pulley 24 takes place with step-up ratio i. The rotation rate course on the belt pulley 24 appears from the curve a. When the upper change rotation rate $n_{so}$ is reached, then the clutch 30 is opened, the belt pulley 24 is then driven directly and falls back along the line b, in order then on further rise from $n_{mot}$ to follow the line c.

When the rotation rate of the internal combustion engine falls off again, the rotation rate of the belt pulley 24 goes back along the line d to the lower change rotation rate $n_{su}$. At this change-over point then the clutch 30 is closed again and the belt pulley 24 is driven with step-up ratio i, in order then on further drop of the engine rotation rate to fall further along the line a.

The offset of the changing rotation rates $n_{su}$ and $n_{so}$ is provided in order to prevent the clutch 30 from being continuously shifted to and fro in the region of the change point.

The basic equipment of the apparatus according to the invention includes, in the region of the control device 56 in all cases the signal lead 58, which is connected with an actual value emitter 58a of the rotation rate $n_{mot}$ of the engine, and a possibility of adjustment for the change rotation rates $n_{so}$ and $n_{su}$ on the ideal value inputs 64 and 66.

Now it is not always necessary that, when the internal combustion engine rotation rate is approaching the lower change point $n_{su}$, a change to drive with stepped-up ratio should actually take place. If for example the current supply, operated by a generator, to the motor vehicle is still sufficiently guaranteed at the lower change rotation rate $n_{su}$, then it is possible and advantageous that even below the change rotation rate $n_{su}$ the belt pulley 24 driving the generator continues to be driven directly, that is with a rotation rate continuing to drop along the line d. Only if for example a notification of need is given by the current supply installation of the motor vehicle at the input 60 saying that now a higher power of the generator is desired, then the belt pulley 24 must be changed over to stepped-up drive. Thus it is possible to set the control unit 56 so that it gives a change-over signal to the change valve 48 for the clutch engagement only when for the one valve 48 for the clutch engagement only when for the one part the actual rotation rate of the internal combustion engine $n_{mot}$ has dropped below the value of the lower change rotation rate $n_{su}$ and when furthermore a need signal is also given at the input 60.

As additional development of the control system it can further be provided that at the change rotation rate $n_{su}$ a change is made to stepped-up drive of the belt pulley 24 only if the change rotation rate $n_{su}$ is fallen short of for a lengthy time $\Delta t_{soll}$. This time $\Delta t_{soll}$, which should elapse, is pre-stated at 68. The time $\Delta t$ which has elapsed since the falling short of the lower change rotation rate $n_{su}$ is ascertained by a time meter and applied at 62. As soon as this time exceeds the value $\Delta t_{soll}$ and for the one part, as before, the actual rotation rate lies below the lower change rotation rate $n_{su}$ and also a need signal lies at 60, the control unit 56 effects a change-over of the control valve to pressure delivery into the pressure chamber 50 of the clutch actuation appliance 34 and thus a switch over to stepped-up drive of the belt pulley 24.

The delay time $\Delta t_{soll}$ is adapted to ensure that the number of change operations is kept to a minimum. This is desired because the change operations can lead to jolts in the drive system which are noticeable to the driver and reduce the driving comfort.

It should be noted that under some circumstances only the time-dependent actuation of the control unit 56 can be provided beside the rotation-rate-dependent controlling, that is it is possible to dispense with the need-dependent controlling.

Figure 4:
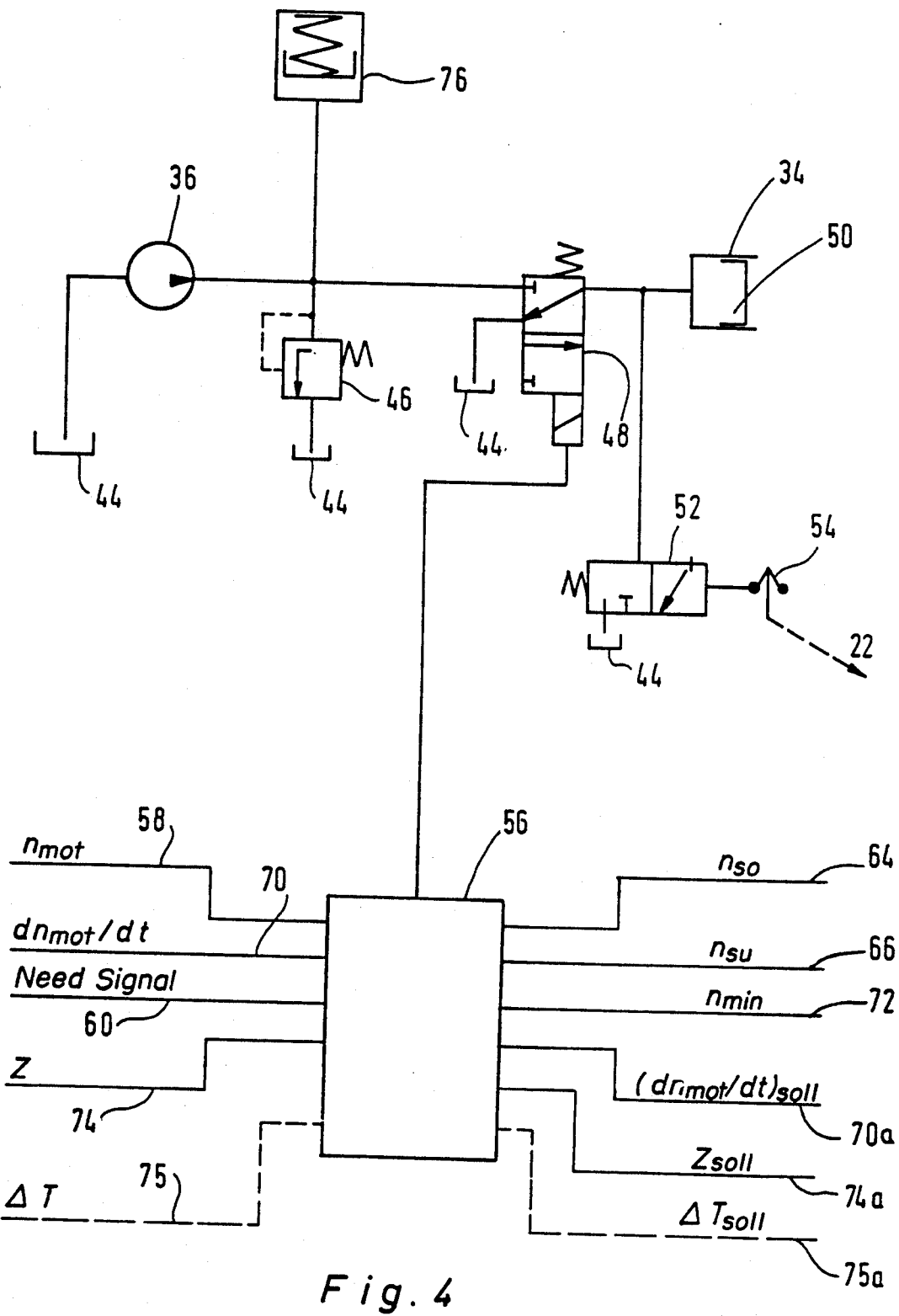
FIG. 4 shows the diagram of a second control system for the pump and valve group according to FIG. 2.

In FIG. 4 there is represented a further development of the control unit 56. Analogous elements are again provided with the same references as in FIG. 3. On the control unit 56 a further input 70 is seen which supplies to the control unit an indication as to the acceleration or retardation dnmot/dt in each case of the rotation rate of the internal combustion engine. It is now possible to provide as additional condition for the response of the control unit 56 in the direction of change-over of the control valve 48 to stepped-up drive of the belt pulley 24, that a specific retardation value ($dn_{mot}/dt$ soll) occurs at the input 70a. The following special circumstance applies here : It is desired that the change-over to stepped-up drive of the belt pulley 24 takes place when at the same time a rotation rate reduction of the internal combustion engine takes place. Then in fact, with the proviso of a finite duration of the change-over operation—in the change to stepped-up drive a lower acceleration of the secondary units to be driven by the drive unit occurs. This per se is desired, but moreover has the advantageous consequence that the reaction upon the internal combustion engine caused by the acceleration of the secondary unit is superimposed upon the retardation of the engine existing in any case, so that the driver notices the change jolt to a lesser extent or not at all.

In practice this means that after entry of the lower change rotation rate $n_{su}$ and possibly after occurrence of a need signal, the operation of change to stepped-up drive of the belt pulley 24 is held back until for the first time a pre-determined retardation of the internal combustion engine occurs, as in braking before a traffic light. Since however it is not impossible that under driving conditions which remain constant it may take too long before such a retardation occurs, for the sake of safety there is yet a further allowance to an input 72 of the control unit 56, namely the allowance $n_{min}$. If the actual rotation rate of the internal combustion engine $n_{mot}$ falls short of the predetermined rotation rate value $n_{min}$, then the changeover operation will be triggered in the change valve 48 by the control unit 56 in the direction of a change to steppedup drive of the belt pulley in any case, even if the occurrence of a pre-determined retardation ($dn_{mot}/dt$ soll) did not take place.

Another possibility of effecting a change to drive of the output member with increased step-up ratio nonetheless if a delay signal fails to appear for too long is entered in chain lines in FIG. 4. An input $\Delta T_{soll}$ lies on the control unit at 75a and a corresponding input $\Delta T$ from a time meter lies on an input conductor 75. If after shortfall of the rotation rate $n_{su}$ the delay signal is missing too long at 70, or does not reach the ideal value at 70a, then the switch of the clutch to stepped-up rotation rate of the output member is effected when the time signal $\Delta T$ fed in at 75 becomes greater than the ideal value $\Delta T_{soll}$ applied at 75a. This signifies that after the time $\Delta T$ in all cases a change of the transmission ratio to higher rotation rate of the output member 24, takes place, even if a delay signal has failed to appear or has not reached the pre-determined ideal value. The time $\Delta T_{soll}$ is ordinarily greater than the time $\Delta t_{soll}$ indicated in FIG. 3, so that within the time $\Delta T_{soll}$ there is a genuine chance of effecting a triggering of the transmission ratio change by the occurrence of a predetermined delay.

In this form of embodiment a pressure reservoir 76 is connected to the output of the pump 36, which reservoir is filled by the pump 36 and ensures that when finally a change-over signal in the direction of a change-over to stepped-up operation is given to the change valve 48, the delivery effect of the pump is supported so that the pressure chamber 50 of the clutch actuation appliance 34 rapidly fills. This is desired because the delay conditions, which should trigger a change to stepped-up drive, frequently last only a short time and one is therefore caused to effect an immediate switch-over on entry of such delay conditions.

Finally the form of embodiment according to FIG. 4 also eliminates frequent changing to and fro between direct and stepped-up drive of the belt pulley 24, which could occur if the driver periodically moves the accelerator pedal to and fro or excessively frequently changes the gear ratio of the vehicle gear. For this reason a further input 74 to the control unit 56 is provided which notifies the number of the change-over operations per unit of time on the clutch 30 to the control unit and in the case of exceeding of a predetermined change frequency $Z_{soll}$ applied at 74a suppresses the further changing of the control valve 48 to stepped-up drive of the belt pulley 24, for a pre-determined time.

Figure 5:
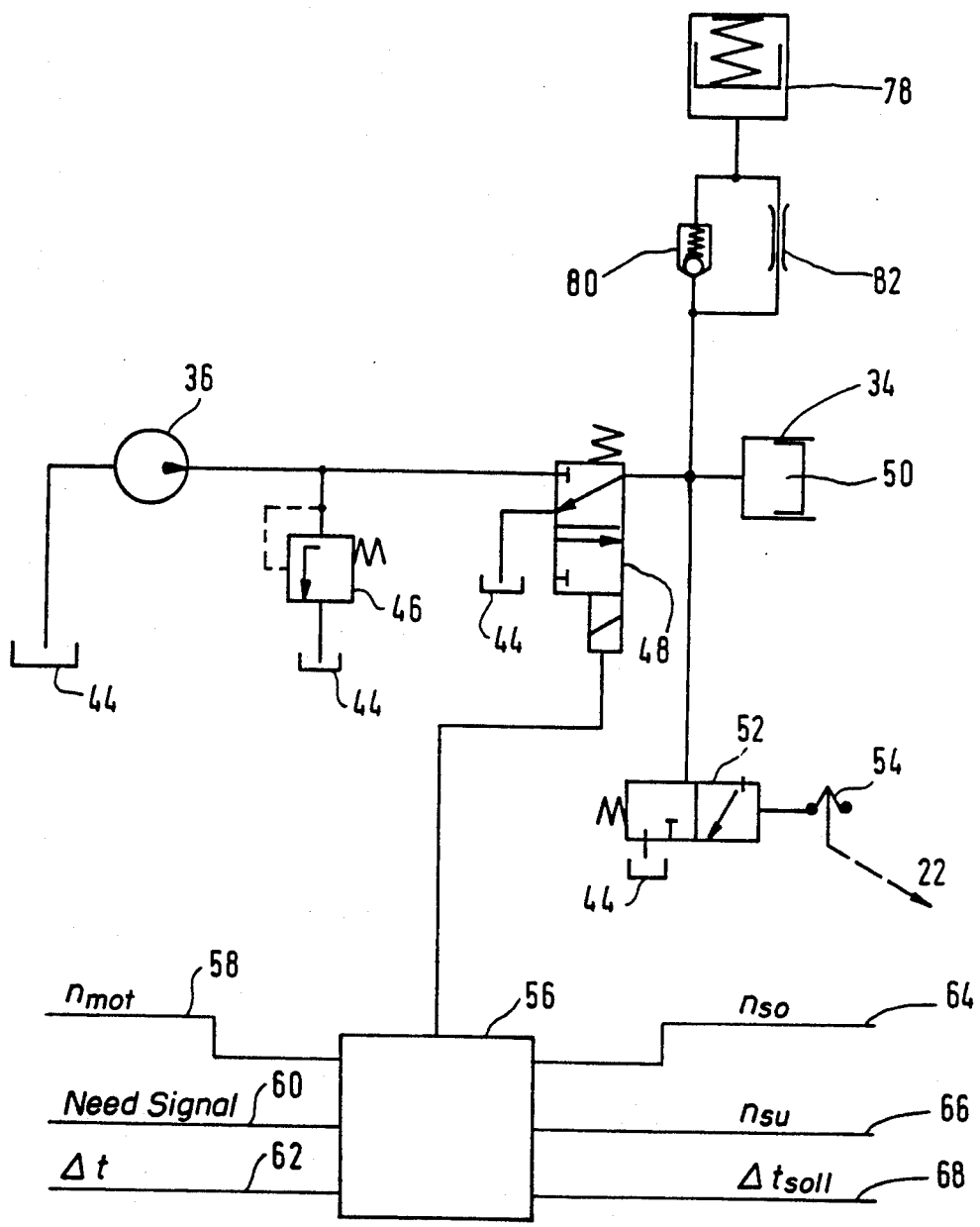
FIG. 5 shows the diagram of a third control system for the pump and valve group according to FIG. 2.

In FIG. 5 there is represented a modification of the form of embodiment according to FIG. 3; analogous elements are again provided with the same references as in FIG. 3. In addition in this form of embodiment a delay store 78 is connected to the pressure chamber 50 of the clutch actuation appliance, through a parallel connection of a non-return valve 80 and a constriction 82. With these hydraulic circuit elements the rise of the torque transmittable by the clutch 30 can be delayed, so that no change jolts detrimental to driving comfort occur due to the acceleration of the secondary drive units. In the dimensioning of this delay it must be taken into consideration that the clutch is not overloaded by slip acting for too long.

The mentioned delay occurs in that on opening of the change valve 48 the delay reservoir 78 is filled through the non-return valve 80 parallel to the pressure chamber 50. The constriction 82 here ensures that the opening of the clutch 30 is not delayed by the return flow out of the delay reservoir 78.

Figure 6:
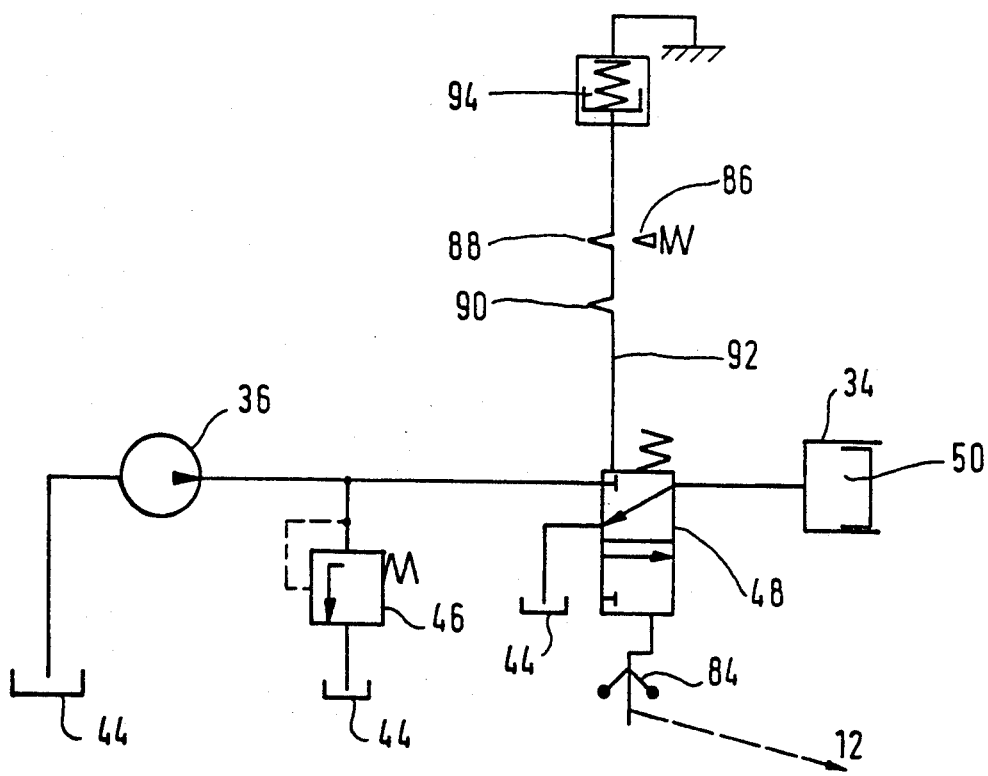
FIG. 6 shows the diagram of a fourth control system for the pump and valve group according to FIG. 2.

In FIG. 6 there is represented an alternative to FIG. 3 simplified by the change logic system. In this form of embodiment the change valve 48 is controlled by a centrifugal governor 84, which in the case of falling short of the lower change rotation rate $n_{su}$ closes the change valve 48, so that the clutch 30 is closed. The centrifugal governor 84 is preferredly connected with the input shaft 12 of the torque transmission unit. The hysteresis corresponding to the different positions of the change rotation rates $n_{su}$ and $n_{so}$ can here be achieved in that a spring-loaded catch member 86 co-operates with thresholds 88 and 90 which are fitted on a linkage 92 connected with the change valve 48.

For the suppression of the change operation in the case of brief shortfall of the lower change rotation rate nsu here a damping member 94 is connected with the linkage 92.

Figure 7:
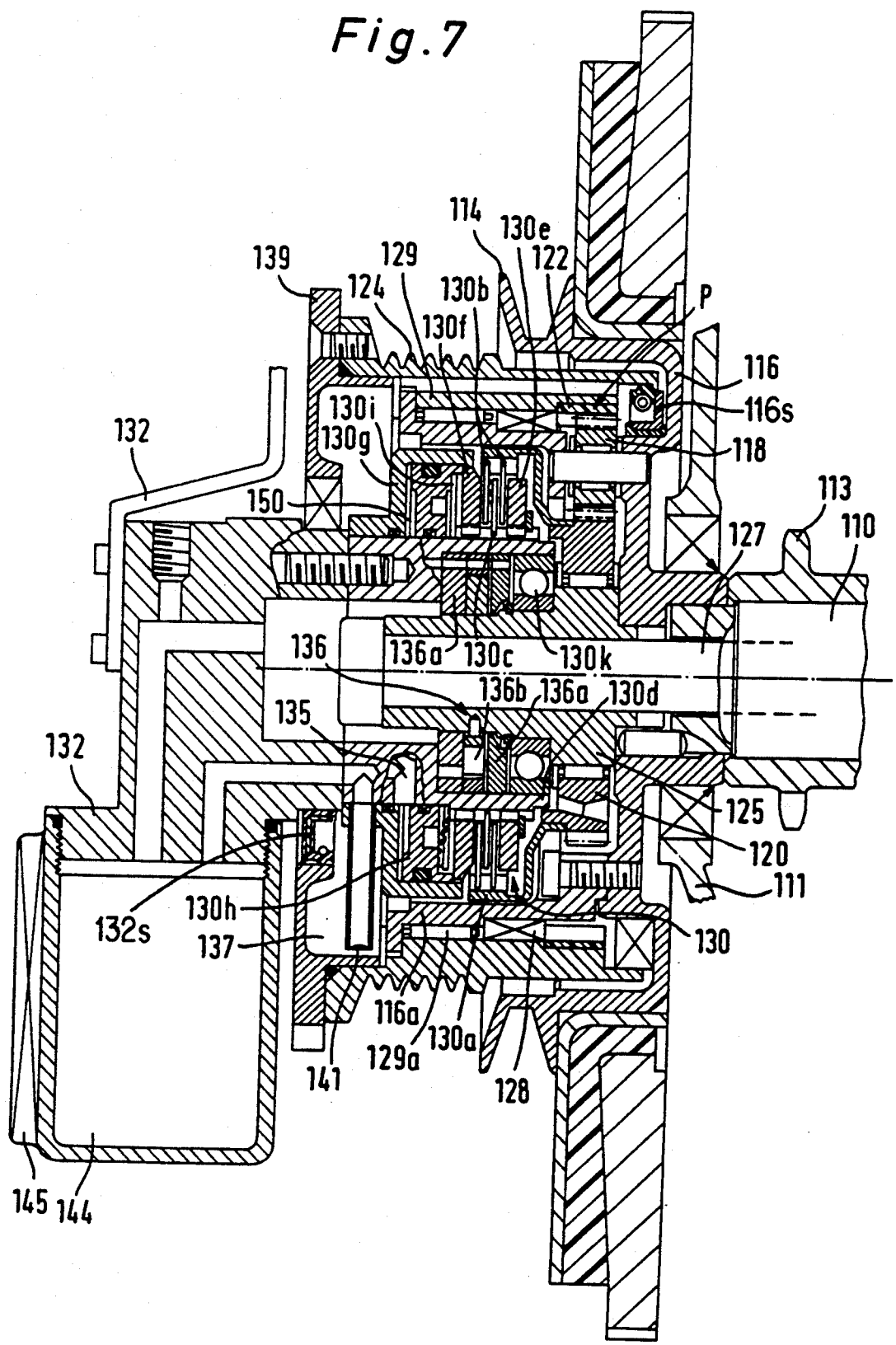
FIG. 7 shows the mechanical assembly of the torque transmission unit in detail.

In FIG. 7 there may be seen the crank-shaft 110 in the region of the end wall 111 remote from the gear, of an internal combustion engine. This crank-shaft 110 carries a drive pinion 113 for the camshaft and the oil pump of the internal combustion engine. On the crank-shaft 110 there is fitted the cross-piece 116 which carries the planet wheel or wheels 118. The planet wheels 118 mesh with the sun wheel 120 which is mounted rotatably on a hub 125. The hub 125 is connected for common rotation with the crank-shaft 110 by a tie bolt 127. The planet wheel 118 further meshes with the hollow wheel 122, which is mounted fast in rotation on a bush 129. The belt pulley 124 is formed on the bush 129. The belt pulley 114 is fitted in one piece on the crosspiece 116. The bush 129 is mounted on a prolongation 116a of the cross-piece 116 by means of a roller bearing 129a. The free-wheel 128 is accommodated between the prolongation 116a and the bush 129. Radially within the prolongation 116a a clutch cage 130a of the clutch 130 is arranged, which is connected fast in rotation with the sun wheel 120 and receives two outer clutch plates 130b non-rotatably but axially displaceably. A further clutch plate 130c is connected fast in rotation with a clutch hub 130d which is mounted on the crank-shaft hub 125 by a ball bearing 130k. The latter plate 130c lies between the two first-mentioned clutch plates 130b. The clutch hub 130d is connected fast in rotation with a torque support 132 which in turn is supported on the housing 111 of the internal combustion engine. The clutch plates 130b and 130c are arranged between a stationary jaw 130e and an axially movable jaw 130f. The stationary Jaw 130d is fitted fast in rotation and axially non-displaceably on the clutch hub 130e.

The movable clutch jaw 130f is axially displaceably but non-rotatably fitted likewise on the clutch hub 130d. Beside the movable clutch jaw 130f a hydraulic cylinder 130g, which accommodates a hydraulic piston 130h, is firmly fitted on the .clutch hub 130d. The hydraulic piston 130h is initially stressed to the left by a dished spring 130i in the direction of release of the clutch. The pressure chamber 150 is situated to the left of the hydraulic piston 130h.

Within the clutch hub 130d the pump 136 is accommodated. The pump stator 136a is connected fast in rotation with the clutch hub 130d; the pump rotor 136b is connected for common rotation with the crank-shaft hub 125.

The pump is a roller cell pump, which is to be discussed later. The pump 136 draws from the tank 144, which is arranged in the region of the torque support 132. The oil delivered from the pump delivery side passes according to the hydraulic diagram in FIG. 2 into the pressure chamber 150 on the left side of the hydraulic piston 130h, so that the clutch plates 130b and 130c can be clamped in between the clutch jaws 130f and 130e, and thus the clutch cage 130a can be made fast in relation to the clutch hub 130d.

The regulating valve 46 is not illustrated in FIG. 7. It is accommodated in one of the parts prevented from rotation by the torque support 132. The pressure oil issuing constantly from the regulating valve 46 flows by way of a bore system 135 into the region of the clutch discs 130b and 130c of the planetary gear P and the various bearings, where it serves as cooling and lubricating oil. The issuing hydraulic oil is collected in a collecting chamber 137 which is formed by a lid 139 of the bush 129. A first sealing ring 116s is provided between the cross-piece 116 and the bush 129. A further sealing ring 132s is provided between the lid 139 and the stationary torque support 132. Since the bush 129 is rotating with the rotation rate of the hollow wheel 122, the hydraulic oil entering the collecting chamber 137 forms a rotating ring within the collecting chamber 137. A baffle pipe 141 extends into this rotating ring tangentially of the axis of the crank-shaft. This baffle pipe leads back to the tank 144. Thus a constant oil circulation and a constant lubrication and cooling are ensured. The tank 144 is provided with cooling fins 145. The tank (44 or 144) may be made in the form of a replaceable cartridge. As such, the tank may be replaced with at least a part of the filling of the hydraulic circuit of hydraulic pump 36.

Figure 8:
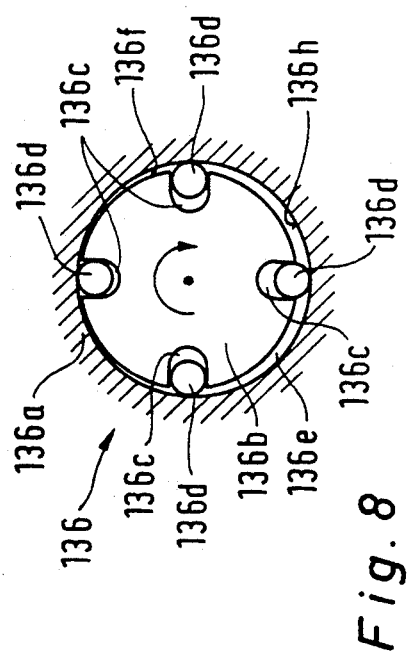
FIG. 8 shows the diagram of a roller-cell pump.

In FIG. 8 there is illustrated in principle a roller cell pump 136. It comprises a stator 136a and a rotor 136b. The rotor 136b rotates with the crank-shaft hub 125. The pump stator 136a comprises an eccentric bore 136h. In the pump rotor 136b there are formed cells 136c. In these cells there are received cylinder rollers 136d which rest under the centrifugal force on the bore 136h of the pump stator 136a. When the pump rotor 136b rotates in the clockwise direction in relation to the pump stator 136a, the space 136e becomes smaller, while the space 136f is enlarged. The reducing space. 136e is connected to the delivery-side exit of the pump 136, that is to say it is connectable according to FIG. 2 through the change valve 48 with the pressure chamber 50. The increasing space 136f is connected through a suction conduit with the tank 44 in FIG. 2.

Figure 9:
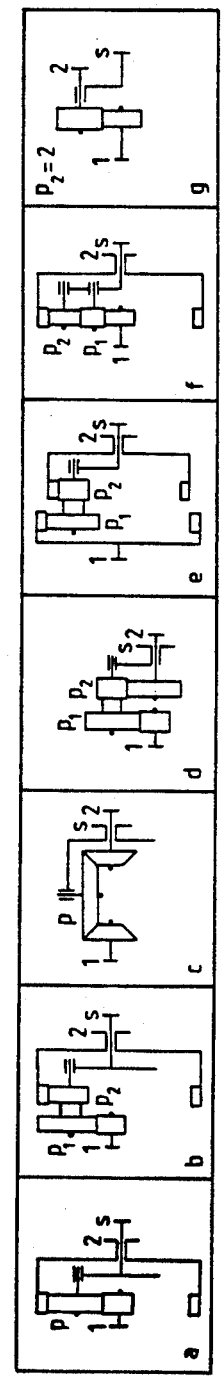
FIG. 9 shows a series of possible planetary gear construction types for use in the torque transmission unit according to the invention.

In FIG. 9 in the sketches a to g there are represented various possible styles of construction of planetary gears for use in a torque transmission unit according to the invention. Here in all Figures a to g the free-wheel and the clutch device are omitted. 1 in each case designates the input member, 2 the output member, s the cross-piece and p the planet wheel. If two planet wheels are present, these are designated by $p_1$ and $p_2$. Figures c and d are here of particular interest. Figure c shows that both the input member and the output member can each be made with a sun wheel and that the planet wheel p can be rotatably mounted on the cross-piece s about an axis perpendicular to the axis of the sun wheels, if only the sun wheels and the planet wheel are formed as bevel wheels, as known in differentia gears. Figure d again shows that due to the presence of two sun wheels it is possible to dispense with a hollow wheel, if a two-stage planet wheel $p_1$, $p_2$ is present.

Specific forms of embodiments of the present invention have been described and illustrated in order to demonstrate the use of the principles of the invention. Of course, the present invention can be realised also in other ways without departing from these principles.

The reference numbers in the claims only serve to facilitate the understanding and are not to be understood as restrictions.

What is claimed is:

1. Torque transmission unit for the drive connection of at least one secondary unit with an internal combustion engine, comprising an input member (12) for connection with an output shaft (10) of the engine, an output member (24) for connection with the secondary unit, a planetary gear wheel unit (P), a free-wheel (28) and a clutch device (30) for connecting a wheel (20) of the planetary gear wheel unit (P) with one of a fixed support part (32) and a further wheel of the planetary gear wheel unit (P), and means for varying the transmission ratio between otuput member (24) and input member (12) in response to notifications provided by signaling means capable of providing information regarding the rotation rate of a rotating part of the planetary gear wheel unit (P) or a rotating part connected therewith and the rotation rate of the secondary unit or a system thereby supplied, the transmission ratio between output member (24) and input member (12) being variable in the direction of an increase of the rotation rate of the output member (22), if
   (a) the signaling means provide a notification (at 58) indicating that the rotation rate of a rotating part of the planetary gear wheel unit (P) or of a rotating part connected therewith has fallen below a predetermined first rotation rate ($n_{su}$) and if
   (b) the signaling means provide a notification (at 60) indicating a need for increase of rotation rate of the secondary unit or a system supplied by the secondary unit.

2. Torque transmission unit according to claim 1 characterised in that the transmission ratio between output member (24) and input member (12) is variable in the direction of an increase of the rotation rate of the output member (24) if in addition to the notifications (a) (at 58) and (b) (at 60)

(c) at least one of the notifications according to (a) and (b) persists over a first pre-determined time ($\Delta t$).

3. Torque transmission unit for the drive connection of at least one secondary unit with an internal combustion engine, comprising an input member (12) for connection with an output shaft (10) of the internal combustion engine, an output member (24) for connection with the secondary unit, a planetary gear wheel unit (P), a free-wheel (28), and a clutch device (30) for connecting a wheel (20) of the planetary gear wheel unit (P) with one of a stationary support part (32) and a further wheel of the planetary gear wheel unit (P), and means for varying the transmission ratio between output member (24) and input member (12) in response to notifications provided by signaling means capable of providing information regarding the rotation rate of a rotating part of the planetary gear wheel unit (P) or a rotating part connected therewith, the transmission ratio between output member (24) and input member (12) being variable in the direction of an increase of the rotation rate of the output member (24) if (a) the signaling means provide a notification (at 58) indicating that the rotation rate of a rotating part of the planetary gear wheel unit (P) or of a rotating part connected therewith has fallen below a predetermined first rotation rate ($n_{su}$) and if (d) the signaling means provide a notification as to a pre-determined retardation ($dn_{mot}/dt_{soll}$) of the rotation rate ($n_{mot}$) of a rotating part of the planetary gear (P) is present (at 70).

4. Torque transmission unit for the drive connection of at least one secondary unit with an internal combustion engine, comprising an input member (12) for connection with an output shaft (10) of the internal combustion engine, an output member (24) for connection with the secondary unit, a planetary gear wheel unit (P), a free-wheel (28), and a clutch device (30) for connecting a wheel (20) of the planetary gear wheel unit (P) with one of a stationary support part (32) and a further wheel of the planetary gear wheel unit (P), and means for varying the transmission ratio between output member (24) and input member (12) in response to notifications provided by signaling means capable of providing information regarding the rotation rate of a rotating part of the planetary gear wheel unit (P) or a rotating part connected therewith, the transmission ratio between output member (24) and input member (12) being variable in the direction of an increase of the rotation rate of the output member (24), if (a) the signaling means provide a notification (at 58) indicating that the rotation rate of a rotating part of the planetary gear wheel unit (P) or of a rotating part connected therewith has fallen below a predetermined first rotation rate ($n_{su}$) and if (e) the signaling means provide a notification (at 58) indicating that the rotation rate of a rotating part of the planetary gear wheel unit (P) has fallen below a further predetermined rotation rate ($n_{min}$) which is less than the predetermined first rotation rate ($n_{su}$).

5. Torque transmission unit for the drive connection of at least one secondary unit with an internal combustion engine, comprising an input member (12) for connection with an output shaft (10) of the internal combustion engine, an output member (24) for connection with the secondary unit, a planetary gear wheel unit (P), a free wheel (28) and a clutch device (30) for connecting a wheel (20) of the planetary gear wheel unit (P) with one of a fixed support part (32) and a further wheel of the planetary gear wheel unit (P), said clutch device (30) being actuatable by the output pressure of a hydraulic pump (36) and means for varying the transmission ratio between the output member (24) and the input member (12), a safety device (52, 54) being provided which comprises means for varying the transmission ratio between output member (24) and input member (12) in response to notifications provided by signaling means capable of providing information regarding the rotation rate of planetary gear wheel unit (P), thereby causing, at a predetermined rotation rate of a rotating part of the planetary gear wheel unit (P), the clutch device to be influenced (30) in the direction of a reduction of transmission ratio between the input member (12) and the output member (24) so that the output member (24) is changed over to a reduced rotation rate.

6. Torque transmission unit for the drive connection of at least one secondary unit with an internal combustion engine, comprising an input member (12) for connection with an output shaft (10) of the internal combustion engine, an output member (24) for connection with the secondary unit, a planetary gear wheel unit (P), a free-wheel (28) and a clutch device (30) for connecting a wheel (20) of the planetary gear wheel unit (P) with one of a stationary support part (32) and a further wheel of the planetary gear wheel unit (P), said clutch device (30) being actuatable by the output pressure of a hydraulic pump (36), which is integrated into the torque transmission unit, said hydraulic pump (36) drawing from a tank (44) which is integrated into the torque transmission unit, said tank (44) being made in the form of a replaceable cartridge which permits replacement of the tank at least with a part of the filling of a hydraulic circuit of the hydraulic pump (36).

* * * * *

UNITED STATES PATENT AND TRADEMARK OFFICE
CERTIFICATE OF CORRECTION

PATENT NO. : 5,147,254
DATED : September 15, 1992
INVENTOR(S) : Wolfgang Baier and Walter Kurz It is certified that error appears in the above-identified patent and that said Letters Patent is hereby corrected as shown below:

On the title page: Item [56]

--U.S. Patent No. 4,674,612 dated 6/1987 of Ogura;

German Patent No. DE 3,622,335 dated 2/1987;
German Patent No. DE 3,740,082 dated 6/1989;
German Patent No. DE 3,508,808 dated 9/1985;
German Patent No. DE 3,523,999 dated 2/1986;
German Patent No. DE 3,103,397 dated 8/1982;
German Patent No. DE 2,801,812 dated 7/1979;
German Patent No. DE 2,303,562 dated 8/1974;
German Patent No. DE 2,938,356 dated 4/1981;
German Patent No. DE 3,118,933 dated 12/1982;
German Patent No. DE 3,626,013 dated 9/1987;
British Patent No. GB 735,922 dated 8/1955;
British Patent No. GB 721,353 dated 1/1955;
British Patent No. GB 531,164 dated 12/1940;
British Patent No. GB 446,166 dated 4/1936;
British Patent No. GB 2,039,638 dated 8/1980.--

Col. 1, line 27, "ration" should read --ratio--.

Col. 5, line 35, "gerar" should read --gear--.

Col. 12, line 47, "nsu" should read --$n_{su}$--.

UNITED STATES PATENT AND TRADEMARK OFFICE
CERTIFICATE OF CORRECTION

PATENT NO.   : 5,147,254
DATED        : September 15, 1992
INVENTOR(S)  : Wolfgang Baier and Walter Kurz It is certified that error appears in the above-identified patent and that said Letters Patent is hereby corrected as shown below:

Col. 14, line 24, "differentia" should read --differential--.

Col. 15, line 35, "is" should read --being--.

Signed and Sealed this

Twenty-eighth Day of December, 1993

BRUCE LEHMAN

Attest:

Attesting Officer

Commissioner of Patents and Trademarks